May 17, 1932.  W. M. DUNCAN  1,859,077
CAST WHEEL
Filed Jan. 5, 1931
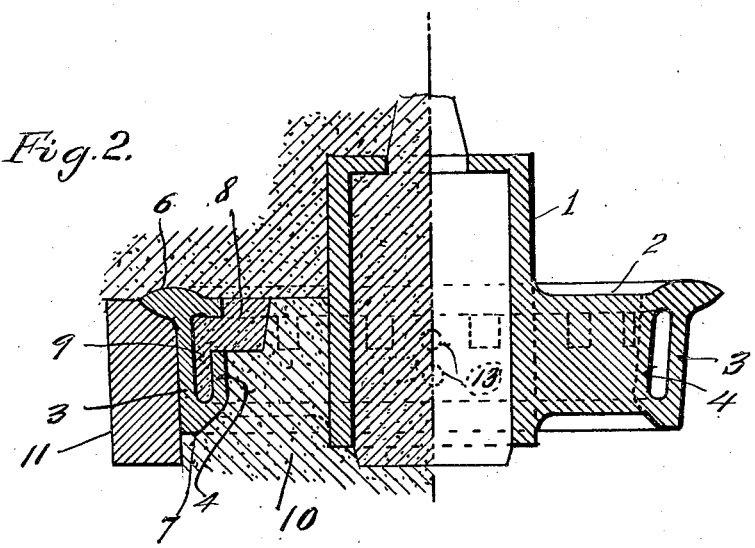
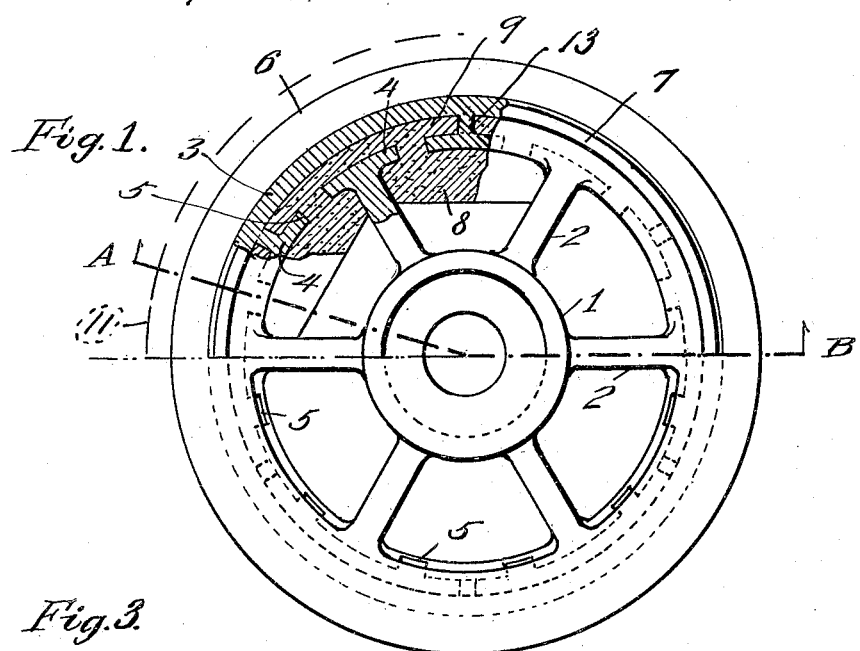
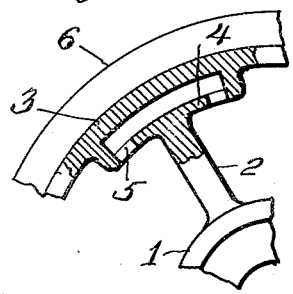
INVENTOR.
William M. Duncan
BY
H. M. Plaisted
ATTORNEY.

Patented May 17, 1932

1,859,077

UNITED STATES PATENT OFFICE

WILLIAM M. DUNCAN, OF ALTON, ILLINOIS

CAST WHEEL

Application filed January 5, 1931. Serial No. 506,699.

This invention relates to certain new and useful improvements in cast wheels, the peculiarities of which will be hereinafter fully described and claimed.

The main objects of my invention are first, to provide a wheel tread the entire surface of which is homogeneous and without soft spots; second, to provide a wheel rim that is hollow opposite the ends of the spokes connecting the rim with the hub; third, to provide a wheel with a hollow rim, the outer wall forming the wheel tread and the inner wall of the rim connected by the spokes to the hub, and thus separating the outer wall forming the tread from the internal strains of the cooling spokes; fourth, to provide a continuous hollow rim of double walls, the outer wall forming the tread and the inner wall spaced therefrom by the interposed chamber, and having spaced openings dividing the inner wall into partial segments; fifth, to brace said divided inner wall from said outer wall; sixth, to allow retaining solid spokes and an unimpaired strength of wheel; seventh, to provide a dry sand core intervening between the outer and inner walls of the hollow rim to retard the heat extraction and leave the parts soft that must be machined; eighth, to lessen the internal shrinkage strains on the spokes; ninth, to provide a tread section of uniform thickness to allow the use of chills of similar section and insure homogeneous chill throughout the tread; tenth, to secure the benefit of the retarding action of a dry sand core in the rim to the withdrawal of heat from the inner rim and spokes, and thereby retain the necessary heat in the wheel for proper annealing in the soaking pit, and more perfectly remove the shrinkage strains; eleventh, to develop the full strength of the spokes necessary to avoid breaking under shrinkage strains, and in practical use; and other objects hereinafter described and claimed.

In the accompanying drawings on which like reference numerals indicate corresponding parts, Fig. 1 represents a plan view of a wheel embodying my invention, the lower half of the figure being a rear view, and the upper half being a face view with portions broken away to show the construction, and indicating the application of a chill and dry sand cores;

Fig. 2, a sectional view of Fig. 1 on the radial lines A and B in connection with a surrounding chill for the tread, and indicating a green sand mold in cope and drag, the latter being provided with peripheral dry sand cores for forming the double walled hollow rim with openings through the inner wall to the interposed chamber; and Fig. 3, a modification showing an interposed chamber only opposite the adjacent ends of the spokes.

Ordinarily, that section of the wheel rim which is radially out from a spoke will not chill at all or at least not to the depth at other parts of the rim, due to the additional body of metal at that location. This results in a tread with alternating hard and soft spots in the cast iron or other suitable metal of which it is composed.

In my construction, however, the rim is hollow and the outer wall forming the tread is practically free from the solid spokes connecting the inner wall to the hub, and thus this undesirable condition is practically eliminated. I provide integral front face and rear walls forming a hollow rim of substantially box section, circumferentially integral and continuous except at those locations on the inner wall where the dry sand cores need support, and incidentally afford vents for releasing any gases that may be evolved from the core.

Referring to the drawings, the numeral 1 designates a wheel hub adapted for a bearing of roller or other form and having radiating spokes 2, preferably solid and integrally connecting said hub with a hollow rim, constituting a one-piece cast wheel of cast iron or other suitable metal.

This rim comprises an outer wall 3 and an inner wall 4 spaced therefrom and preferably parallel to the outer wall and connected by front and rear face walls forming an interposed chamber preferably extending completely around the rim. Said outer wall 3 is of practically uniform section and separated by the interposed chamber from the solid spokes 2 that are integral at their outer ends with the inner wall 4.

A series of spaced rectangular or other shaped openings 5 are formed in said inner wall, preferably near the back flange 6 and extending toward the front face 7 of the wheel about a third of the depth of said inner wall. These openings divide the inner wall into partial segments as shown in Fig. 1. They also serve to support radial inward projections from a dry sand core 8 having an outer circular portion 9 adapted to space apart the said walls and form the interposed chamber. These openings also allow of releasing the gases that may evolve from said circular portion 9 within the rim. This dry sand core as indicated in Figs. 1 and 2, forms the peripheral portion of a green sand mold 10 in the drag in which is formed the balance of the spokes and the hub. The cope is also green sand and the hub has a dry sand core for the usual or any desired bore.

Surrounding the rim is a metal chill 11 of uniform thickness adapted to exert a uniform chilling effect upon the substantially uniform thickness of the outer wall of the hollow rim, so that a uniform homogeneous chilling effect is produced on the tread. Since the solid spokes are connected to the inner wall and the interposed chamber separates the inner wall from the outer wall as shown, the heat from said spokes has practically no effect upon the outer wall as would be the case if the spokes were directly connected thereto. Furthermore, the dry sand core forming said chamber serves to retard the withdrawal of heat by the chill from the inner wall, and thus shields the inner wall. More heat is thus retained in the spokes and hub which heat is vital for proper annealing in the soaking pit. Strains are more perfectly removed and less liability of fracture of the spokes is obtained.

This method is the subject of a divided application filed June 22, 1931, Serial No. 545,970.

Between the outer and inner walls I provide bridge connections of cylindrical or other form 13 integrally connecting and bracing the two walls. These bridge connections are shown opposite the partial segments alternating with the segments at the ends of the spokes, so that the segments at the ends of the spokes are not directly connected to the outer wall except by the front and back walls of the rim. These bridge connections may be otherwise spaced if desired.

It will be observed from the upper half of Fig. 1 and the right hand half of Fig. 2, that the ends of the solid spokes and the partial segments of the inner wall to which they are integrally connected, are thus more or less insulated from the outer chilled wall and have practically no extra heating effect upon the outer wall, and consequent formation of soft spots in the tread, which is the case in the usual construction. Therefore the chill may be of uniform cross section, instead of having the irregular enlargements of cross section used in the endeavor to compensate for the extra heat at different portions of the tread opposite the spokes; I thus avoid the use of chills that must compensate by their irregularity of mass, for the various chilling tendencies of other irregular rim sections.

Furthermore, by my construction, more heat is retained in the spokes and the hub and the metal of the spokes is less subject to internal strains and consequent fracture. These spokes can thus be made solid and of sufficient strength to withstand rough usage as in mine cars where it is a common practice to "sprag" the wheels,—that is, check their rotation by insertion of a bar between the spokes.

Fig. 3 shows a modification in which the double walls and interposed chamber of the rim are disposed only opposite the adjacent ends of the spokes, where it is most necessary to shield the chilled tread from the heat of the solid spokes. In this modification, the wall forming the tread is of substantially uniform thickness as previously shown and described, but portions of the rim opposite the ends of the spokes have double walls while the intervening portions of the tread are of single wall construction. In other words, instead of forming a continuous interposed chamber as above described, I have shown separated chambers at the points where they will be most effective in obtaining the advantages heretofore set forth.

I claim:

1. A cast wheel comprising walls forming an outer rim constituting the tread, an inner rim spaced therefrom by an interposed chamber, the inner rim having openings communicating with said chamber and dividing the inner rim into partial segments, substantially as described.

2. A cast wheel comprising a rim having outer and inner walls integrally connected by front and rear walls forming a box section with an interposed chamber, the outer wall forming the tread, and the inner wall having transverse openings dividing the inner wall into partial segments, and solid spokes integral with some of said segments, substantially as described.

3. A cast wheel comprising walls forming the tread, an inner rim and interposed chamber, the inner wall having openings dividing said inner rim into partial segments, and integral bridges from the outer wall to some of the segments of the inner wall, substantially as described.

4. A cast wheel comprising a hub, a continuous integral outer wall forming the tread extending transversely from the front face to a flange, an inner wall spaced from the outer wall by an interposed chamber and divided into partial segments by transverse openings into said chamber, and solid spokes integrally connecting said hub with some of said segments, substantially as described.

5. A cast wheel comprising a hub, an outer wall forming the tread and extending transversely from the face to a rear flange, a parallel inner wall spaced from the outer wall by an interposed chamber and having transverse openings dividing said inner wall into partial segments, integral bridge connections between said outer wall and some of said segments, and spokes integrally connecting said hub with some of said segments, substantially as described.

6. A cast wheel comprising a hub, outer and inner walls integral with each other and spaced apart by an interposed chamber forming a hollow rim, the inner wall having openings into said chamber for supporting dry sand cores for said chamber, and solid spokes integrally connecting the hub with some of said segments, substantially as described.

In testimony whereof I have affixed my signature.

WILLIAM M. DUNCAN.